US010622870B2

(12) United States Patent
Campbell et al.

(10) Patent No.: US 10,622,870 B2
(45) Date of Patent: Apr. 14, 2020

(54) OPERATING POINT DETERMINATION IN AN ELECTRIC MOTOR SYSTEM

(71) Applicant: Faraday & Future Inc., Gardena, CA (US)

(72) Inventors: Mengwei Campbell, Torrance, CA (US); Stefan Grubic, Hermosa Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/189,963

(22) Filed: Jun. 22, 2016

(65) Prior Publication Data

US 2017/0317617 A1 Nov. 2, 2017

Related U.S. Application Data

(63) Continuation-in-part of application No. 15/144,252, filed on May 2, 2016.

(51) Int. Cl.
*H02P 21/14* (2016.01)
*H02K 11/24* (2016.01)
(Continued)

(52) U.S. Cl.
CPC .......... *H02K 11/24* (2016.01); *H02P 21/0089* (2013.01); *H02P 21/22* (2016.02); *H02P 2101/45* (2015.01)

(58) Field of Classification Search
CPC ................................. H02P 6/08; H02K 11/24
See application file for complete search history.

(56) References Cited

U.S. PATENT DOCUMENTS 6,087,792 A * 7/2000 Wang ..................... A63B 22/02
318/362
6,986,688 B1 * 1/2006 Jansen ................. B63H 20/007
440/1

(Continued)

OTHER PUBLICATIONS

Office Action for U.S. Appl. No. 15/144,252, dated Oct. 11, 2017, Mengwei Campbell, "Operating Point Determination in an Electric Motor System", 19 pages.

(Continued)

*Primary Examiner* — Muhammad S Islam
(74) *Attorney, Agent, or Firm* — Veros Legal Solutions, LLP

(57) ABSTRACT

Systems and methods are described for controlling an electric motor. An exemplary system may include a torque detector configured to detect an output torque of the electric motor. The system may also include a controller configured to control a voltage source to apply a predetermined voltage to drive the electric motor and determine an operating table containing a plurality of operating points. The controller may select an operating current value and generate a plurality of current commands. The controller may also apply each of the plurality of current commands to drive the electric motor and determine an output torque generated by the electric motor. The controller may further determine a target current command that generates a maximum output torque. In addition, the controller may determine an operating point of the operating table based on the target current command. Moreover, the controller may control the electric motor using the operating table.

24 Claims, 11 Drawing Sheets

(51) Int. Cl.
*H02P 21/22* (2016.01)
*H02P 21/00* (2016.01)
*H02P 101/45* (2016.01)

(56) References Cited

U.S. PATENT DOCUMENTS

| | | |
|---|---|---|
| 2006/0055363 A1 | 3/2006 | Patel et al. |
| 2007/0296364 A1 | 12/2007 | Shoemaker et al. |
| 2008/0100254 A1 | 5/2008 | Rahman et al. |
| 2009/0153087 A1* | 6/2009 | Lim .................. H02P 21/14 318/432 |
| 2009/0284195 A1 | 11/2009 | Gallegos-Lopez et al. |
| 2012/0217916 A1* | 8/2012 | Wu .................... H02P 21/0025 318/400.11 |
| 2013/0181642 A1 | 7/2013 | Khan et al. |
| 2014/0058609 A1* | 2/2014 | Matsuda ............... B62J 99/00 701/22 |
| 2014/0375236 A1 | 12/2014 | Kim et al. |
| 2015/0180387 A1 | 6/2015 | Yoo et al. |
| 2015/0349679 A1* | 12/2015 | Rogers .................. H02P 6/08 318/400.3 |

OTHER PUBLICATIONS

Office Action for U.S. Appl. No. 15/144,252, dated Apr. 20, 2017, Mengwei Campbell, "Operating Point Determination in an Electric Motor System", 17 pages.

PCT Search Report & Written Opinion for Application No. PCT/US2017/030700, dated Sep. 20, 2017, 9 pgs.

* cited by examiner

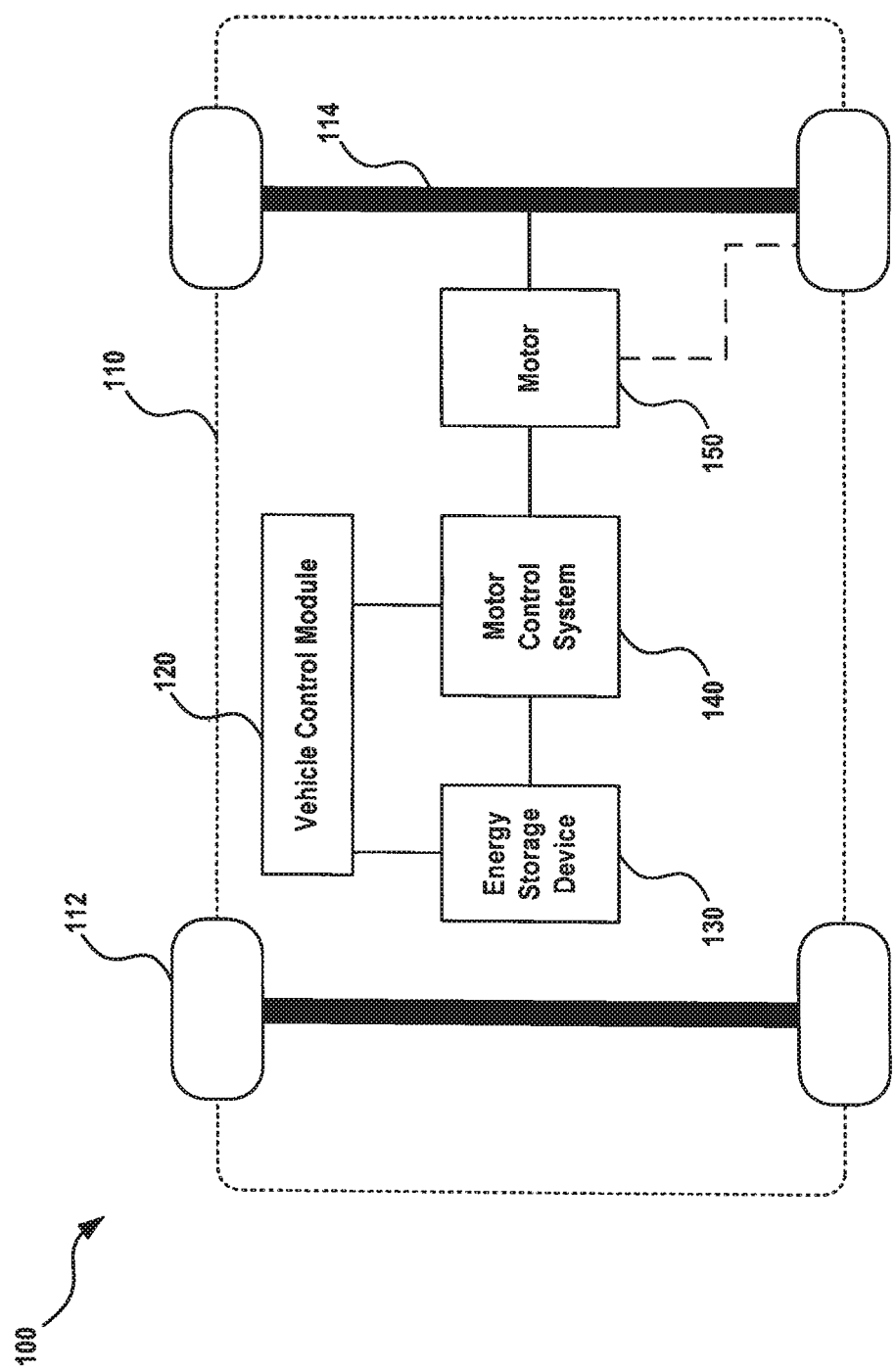

OPERATING POINT DETERMINATION IN AN ELECTRIC MOTOR SYSTEM

CROSS-REFERENCE TO RELATED APPLICATION

The present application is a Continuation-In-Part (CIP) of U.S. patent application Ser. No. 15/144,252, filed May 2, 2016, the entire content of which is incorporated herein by reference.

TECHNICAL FIELD

This disclosure relates generally to control of electric or electrical motors, and more particularly, to systems and methods for determining operating points for implementing maximum torque per ampere—(MTPA-)based motor control.

BACKGROUND

Closed loop control is commonly used to regulate motor torques of high performance alternating current (AC) motors. In a typical closed loop control system of an electric motor, a target torque to be output by the electric motor can be input to the control system using a torque command. The control system then converts the torque command to a current command according to a pre-calculated look-up table. The look-up table includes data about mapping relationship between torque commands and their corresponding current commands. In some cases, multiple tables may be provided, each corresponding to a different direct current (DC) link voltage used to generate AC phase voltages through an inverter.

Each current command in the look-up table may also be referred to as an operating point. Calculation of operating points in one or multiple look-up tables is usually very time consuming. For example, it may take weeks or even months to determine all operating points in a look-up table.

SUMMARY

In one aspect, the present disclosure is directed to a system for controlling an electric motor. The system may include a torque detector configured to detect an output torque of the electric motor. The system may also include a controller configured to control a voltage source to apply a predetermined voltage to drive the electric motor and determine an operating table containing a plurality of operating points. The controller may select an operating current value and generate a plurality of current commands based on the operating current value. The controller may also apply each of the plurality of current commands to drive the electric motor and determine, using the torque detector, an output torque generated by the electric motor resulting from application of each of the plurality of current commands. The controller may further determine, from the plurality of current commands, a target current command that generates a maximum output torque. In addition, the controller may determine an operating point of the operating table based on the target current command. Moreover, the controller may control the electric motor using the operating table.

In another aspect, the present disclosure is directed to a method for controlling an electric motor. The method may include controlling a voltage source to apply a predetermined voltage to drive the electric motor. The method may also include selecting an operating current value and generating a plurality of current commands based on the operating current value. The method may further include applying each of the plurality of current commands to drive the electric motor and determining an output torque generated by the electric motor resulting from application of each of the plurality of current commands. The method may also include determining, from the plurality of current commands, a target current command that generates a maximum output torque. In addition, the method may include determining an operating point of the operating table based on the target current command. Moreover, the method may include controlling the electric motor using the operating table.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

The foregoing general description and the following detailed description are exemplary and explanatory only, and are not restrictive of the claims.

BRIEF DESCRIPTION OF THE DRAWINGS

FIG. 1 is a block diagram of an exemplary embodiment of a vehicle equipped with an electric motor propulsion system;

DETAILED DESCRIPTION

Figure 2A:
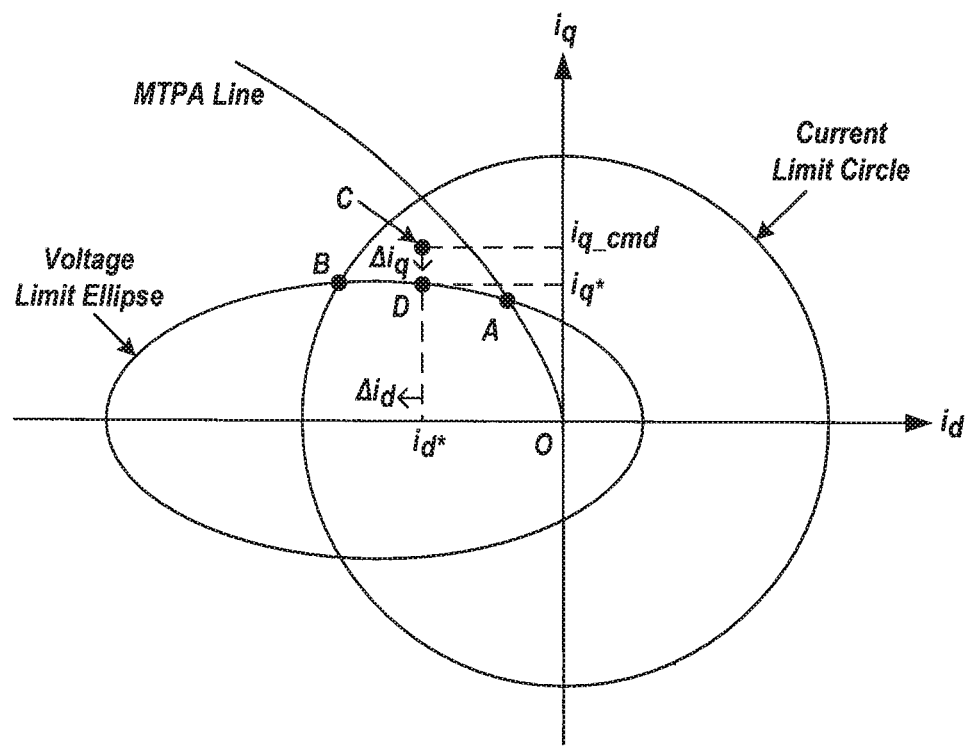
FIGS. 2A and 2B show exemplary operating points in a reference frame.

FIG. 1 is a block diagram of an exemplary embodiment of a vehicle 100, according to one aspect of the disclosure. Vehicle 100 may have any body style, such as a sports car, a coupe, a sedan, a pick-up truck, a station wagon, a sports utility vehicle (SUV), a minivan, or a conversion van. Vehicle 100 may be an electric vehicle, a hybrid vehicle, or any other vehicle that is entirely or partially powered by electricity.

As shown in FIG. 1, vehicle 100 may include a chassis 110 and a plurality of wheels 112. Chassis 110 may be mechanically coupled to wheels 112 by, for example, a suspension system. Vehicle 100 may also include an electric or electrical motor propulsion system. For example, vehicle 100 may include one or more electric motors, such as motor 150, to supply motive torque. Wheels 112 may be coupled to motor 150 in various ways. In one embodiment, as illustrated in FIG. 1, opposite wheels may be connected through a shaft 114, which may be mechanically coupled to motor 150 to transmit torque and rotation from motor 150 to the connecting wheels. In another embodiment, motor 150 may drive individual wheels directly, as illustrated, in a simplified manner, by a dashed line from motor 150 to the lower right wheel. For example, motor 150 may be located close to a wheel to provide driving power directly to the wheel. In this case, multiple motors may be used and each wheel may be driven by a separate motor or a group of motors. In another example, motor 150 may be built into a wheel such that the wheel may rotate co-axially with a rotor of the motor.

Motor 150 may be an AC synchronous electric motor including a rotor and a stator (not shown). The stator may include a plurality of poles, with each pole including windings connected to an AC power source, such as a three-phase AC power source. During operation, the AC powered stator may generate a rotating magnetic field to drive the rotor to rotate. The rotor may include windings and/or permanent magnet(s) to form a magnet such that the north/south pole of the magnet is continuously attracted by the south/north pole of the rotating magnetic field generated by the stator, thereby rotating synchronously with the rotating magnetic field. Exemplary AC synchronous electric motors include interior permanent magnet (IPM) motors, reluctance motors, and hysteresis motors.

Motor 150 may be controlled by a motor control system 140. Motor control system 140 may regulate energy transfer from an energy storage device 130 to motor 150 to drive motor 150. In some embodiments, motor 150 may operate in a generator mode, such as when vehicle 100 undergoes speed reduction or braking actions. In the generator mode, the excess motion energy may be used to drive motor 150 to generate electrical energy and feed the energy back to energy storage device 130 through motor control system 140. In some embodiments, energy storage device 130 may include one or more batteries to supply DC power. Motor control system 140 may include a DC-AC inverter to convert the DC power supplied by energy storage device 130 into AC driving power to drive motor 150. For example, the DC-AC inverter may include power electronic devices operating under a pulse-width modulation (PWM) scheme to convert the DC power into AC power.

Vehicle 100 may include a vehicle control module 120 to provide overall control of vehicle 100. In some embodiments, vehicle control module 120 may act as an interface between user operation and propulsion system reaction. For example, when a driver depresses an acceleration pedal of vehicle 100, vehicle control module 120 may translate the acceleration operation into a torque value to be output by motor 150, a target rotation speed of motor 150, or other similar parameters to be executed by the propulsion system. Vehicle control module 120 may be communicatively connected to motor control system 140 to supply commands and/or receive feedback. Vehicle control module 120 may also be communicatively connected to energy storage device to monitor operation status such as energy level, temperature, recharge count, etc.

In some embodiments, motor 150 may be a synchronous motor, such as an IPM motor, driven by three-phase power. The three-phase signals can be represented in a reference frame, using a direct-quadrature (d-q) coordinate system. For example, if the magnetic axis of the rotor is aligned with the d-axis of the reference frame, the motor flux can be controlled by the d-axis current and the motor torque can be controlled by the q-axis current. Thus, the flux and torque control are decoupled. In addition, when motor 150 is a synchronous motor, and the d-axis of the d-q reference frame is aligned with the rotor magnetic axis, then the d-q reference frame is a synchronous frame.

The stator voltages of the IPM in the synchronous frame can be represented as follows:

$$V_{ds} = R_s i_{ds} + L_{ds}\frac{di_{ds}}{dt} - \omega_e L_{qs} i_{qs} \qquad (1)$$

$$V_{qs} = R_s i_{qs} + L_{qs}\frac{di_{qs}}{dt} + \omega_e L_{ds} i_{ds} + \omega_e \lambda_f \qquad (2)$$

where $R_s$ is stator resistance, $\omega_e$ is electrical speed, $V_{ds}$ and $V_{qs}$ are stator voltages, $i_{ds}$ and $i_{qs}$ are stator line currents, $L_{ds}$ and $L_{qs}$ are d- and q-axis inductances in the synchronous reference frame, and $\lambda_f$ is permanent magnet flux linkage. The torque equation is as follows:

$$T = 3/2 n_p (\lambda_f i_{qs} + (L_{ds} - L_{qs}) i_{qs} i_{ds}) \qquad (3)$$

where $n_p$ is the number of pole pairs.

In some embodiments, motor 150 may be driven by an inverter, which converts a DC voltage, for example provided by energy storage device 130, into three-phase AC voltages for driving motor 150. In this case, the torque and speed of motor 150 may be limited by the voltage and current ratings of the inverter and/or motor 150. For example, the maximum stator voltage $V_{s\_max}$ may be limited by the DC voltage (also referred to as the DC line voltage). Therefore, the constraint applied to the d- and q-axis voltages can be represented as follows:

$$V_{ds}^2 + V_{qs}^2 \leq V_{s\_max}^2 \qquad (4)$$

Similarly, the stator current may be limited by the maximum current $I_{s\_max}$ that can be supported by motor 150 and/or the power electronic devices of the inverter:

$$i_{ds}^2 + i_{qs}^2 \leq I_{s\_max}^2 \qquad (5)$$

In steady state, the derivative terms in equations (1) and (2) are zero and thus, those derivative terms can be omitted. In addition, when the speed is high, the voltage drop across the stator resistor can be neglected. Therefore, equations (1) and (2) can be simplified by omitting both the derivative terms and the stator resistor voltage terms. Substituting the d- and q-axis voltages in equation (4) with the simplified equations (1) and (2) yields the following voltage constraint as a function of the stator currents:

$$L_{ds}^2 \left(i_{ds} + \frac{\lambda_f}{L_{ds}}\right)^2 + L_{qs}^2 i_{qs}^2 \leq \left(\frac{V_{s\_max}}{\omega_e}\right)^2 \qquad (6)$$

The current constraint shown in equation (5) can be graphically represented in the d-q reference coordinates as a circle. Similarly, the voltage constraint, in terms of stator currents, as shown in equation (6) can be graphically represented as an ellipse. FIG. 2A illustrates an exemplary current limit circle and an exemplary voltage limit ellipse defined by equations (5) and (6), respectively. In FIG. 2A, the horizontal axis is the d-axis, represented by $i_d$, while the vertical axis is the q-axis, represented by $i_q$. A stator current can be represented by a point in the d-q reference frame shown in FIG. 2A, such as a point $(i_{ds1}, i_{qs1})$ (not shown). Such a point can be referred to as an operating point. Alternatively, operating point $(i_{ds1}, i_{qs1})$ can also be represented by a magnitude and an angle of a current vector, which points from the origin (point O) to the end point ($i_{ds1}$, $i_{qs1}$).

A feasible operating point should satisfy both equations (5) and (6). Therefore, all feasible operating points should be within the overlapping area of the voltage limit ellipse and the current limit circle.

FIG. 2A also shows an MTPA line, which represents current commands that generate the maximum torque at a given operating current magnitude at a given speed and a given DC line voltage. During the operation of motor 150, it is desirable that the operating point follows the MTPA line. However, due to the voltage constraints the MTPA line cannot be followed beyond the voltage limit. To further increase the torque, the operating point has to follow the envelope of the voltage limit ellipse. In FIG. 2A, this section of the voltage limit ellipse envelope is between point A (the intersection of the voltage limit ellipse and the MTPA line) and point B (the intersection of the voltage limit ellipse and the current limit circle). Because motor 150 operates in a field weakening mode when the operating point is on the voltage limit ellipse envelope between A and B, such an operating point can also be referred to as an MTPA point in the field weakening region. The voltage limit ellipse envelope between A and B may be referred to as the MTPA line in the field weakening region. In contrast, the points on the MTPA line between the origin O and point A can be referred to MTPA points in a non-field weakening region. Accordingly, the section between O and A can be referred to as the MTPA line in the non-field weakening region. Point A may also be referred to as the first field weakening point.

In a closed loop motor control method, operating points may be stored in a look-up table to convert a torque command into a current command. The look-up table may be referred to as an operating table or a control table, which may include multiple tables, each corresponding to a different DC line voltage. In each individual table, mapping relationship between torque commands and current commands are stored for different motor rotational speeds (also referred to as motor speed or speed for simplicity). For example, a torque command in a table may correspond to a current command, which may be represented as a combination of current magnitude and angle and/or a combination of d- and q-axis current components. The input to the table may be a torque command, indicating the desired torque to be output by the motor, along with the DC line voltage and the motor speed. The output of the table may be the current command according to the mapping relationship stored in the table.

Accurate determination of the operating table for all available DC line voltages and all available speeds in both motoring (e.g., $i_q>0$) and regeneration (e.g., $i_q<0$) modes can be a time consuming and tedious task. For example, the operating points can be determined through simulation using motor machine models. However, using motor machine models usually does not provide a sufficiently accurate solution due to uncertainties in the models, especially uncertainties regarding the losses (e.g., DC & AC resistive losses, core losses, windage and friction losses, etc.). Alternatively, an experimental approach can be conducted, in which the whole operating map is scanned to identify operating points. However, current techniques for conducting the experimental procedure is very time consuming. The accuracy of the experimentally obtained operating points depends on the current and angle increment(s) used for scanning. To achieve a higher accuracy a smaller increment is required, leading to a longer time to complete the scan.

The embodiments disclosed in this application aim to accelerate the operating table determination process. An exemplary process may include three parts. The first part includes determination of MTPA lines below the base speed of motor 150 using any available methods. The second part may include determination of MTPA lines in the field weakening region. The third part may include determination of MTPA lines in the non-field weakening region. Any one of the three parts may include determination of MTPA lines in both motoring and regeneration modes.

In some embodiments, operating points in the field weakening region (e.g., between A and B in FIG. 2A) may be obtained by regulating the current command so that the maximum voltage is applied to motor 150. In some embodiments, the maximum voltage may be the maximum AC voltage that can theoretically and/or practically be produced by an AC power supply of motor 150. For example, the maximum voltage can be represented using the peak value of the AC voltage. When an inverter is used as an AC power supply by converting DC voltage (e.g., provided by energy storage device 130) into AC voltage that drives motor 150, the amplitude (e.g., the peak value) of the AC voltage depends on the DC voltage. Therefore, the maximum voltage also depends on the DC voltage.

The current command can be regulated in several ways to apply the maximum voltage to motor 150. In some embodiments, the current command may be regulated by an operating table controller. The operating table controller may include a proportional-integral (PI) regulator. The PI regulator can regulate the current command such that a resulting stator voltage converges to the maximum voltage. In other words, the PI regulator can reduce and/or minimize the difference between the resulting stator voltage and the maximum voltage through a closed loop feedback process. FIG. 2A shows an exemplary current command regulating process. As shown in FIG. 2A, to determine an operating point D on the envelope of the voltage limit ellipse, the d-axis current component (e.g., $i^*_d$) may be fixed and the q-axis current component may be adjusted by the PI regulator until motor 150 operates at target operating point D (point ($i^*_d$, $i^*_q$)) where the maximum voltage is applied to motor 150. For example, a q-axis current command $i_{q\_cmd}$ may be used as an initial value, and the operating point defined by $i^*_d$ and $i^*_{q\_cmd}$ may be represented by point C. The regulating process may adjust $i_{q\_cmd}$ by a correction value $\Delta i_q$ one or more times until $i_{q\_cmd}$ reaches or approaches closely enough to $i^*_q$. In other words, the regulating process moves the initial point C to target point D, where the maximum voltage is applied to motor 150. Once point D is determined, $i^*_d$ may be changed to the next value by an increment $\Delta i_d$ to determine the next operating point.

The method described above can significantly increase the speed and accuracy of operating point determination. In addition, using this method, not only the operating points between A and B but all operating points along the voltage limit ellipse can be determined. In some embodiments, points between A and B (i.e., MTPA points in the field weakening region) may be added to the operating table(s) used for the control of motor 150. In some embodiments, the method described above or a variation thereof may be used to control motor 150 in real time operation.

In some embodiments, operating points in the non-field weakening region (e.g., between O and A in FIG. 2A) may be determined by sweeping current commands corresponding to a given operating current value at a single DC line voltage. The determined operating points may then be used for other DC line voltage values because these operating points are not DC line voltage related. For example, the maximum DC line voltage can be used to determine the operating points in the non-field weakening region and the resulting operating points may be used for all lower DC voltage levels.

Figure 2B:
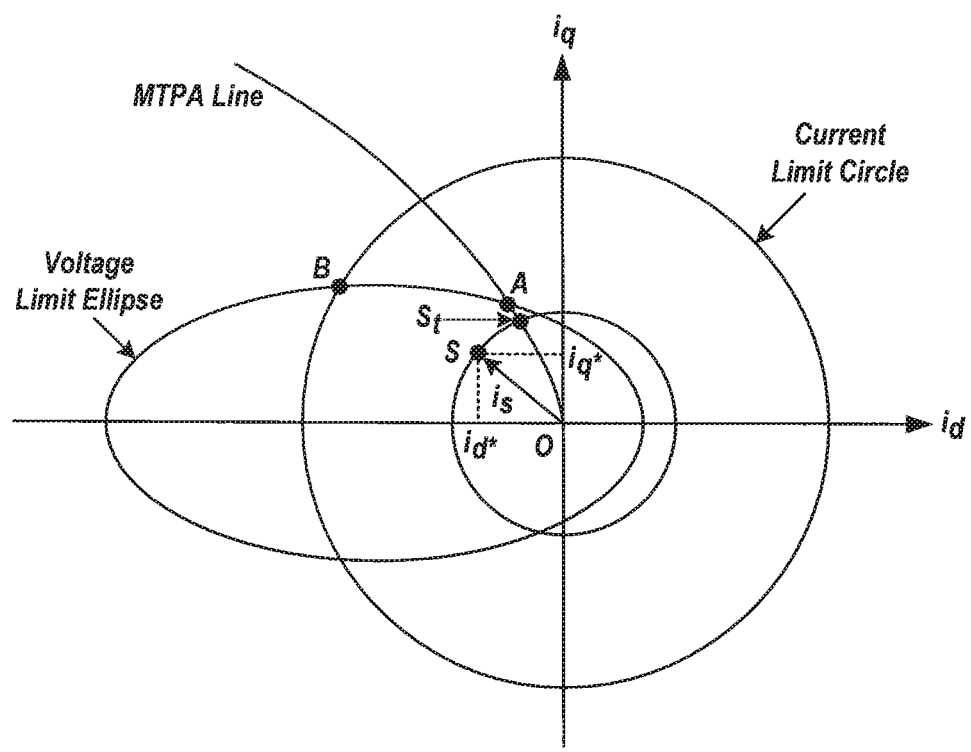

FIG. 2B shows an exemplary method of determining the operating points in the non-field weakening region. Referring to FIG. 2B, for each operating current value $i_s$ having a magnitude $I_s$, a plurality of current commands (e.g., one such current command may be denoted as $(i^*_d, i^*_q)$, represented by point S in FIG. 2B) may be generated by sweeping the d-axis current component $i^*_d$ from zero to $-I_s$ in appropriate current increments $\Delta i_d$, which may be the same as or different from the d-axis current increments used for determining the operating points in the field weakening region. For each d-axis current component $i^*_d$, the q-axis current component $i^*_q$ may be swept from zero to the maximum feasible value in appropriate current increment $\Delta i_q$, which may be the same as or different from the q-axis current increments used for determining the operating points in the field weakening region. The maximum feasible value of the q-axis current component can be determined by $I_{q\_max} = \sqrt{I_s^2 - I_d^2}$, where $I_{q\_max}$ is the maximum feasible value of the magnitude of the q-axis current component and $I_d$ is the magnitude of the given d-axis current component $i^*_d$ for sweeping the q-axis current component. Each of the plurality of current commands may be applied to drive motor 150 and a corresponding output torque may be detected. Among the plurality of current commands, the one that generates the maximum output torque may be determined as the target current command, which may be represented by operating point $S_t$ in FIG. 2B. Operating point $S_t$ may be recorded as one of the points on the MTPA line in the non-field weakening region. Although $S_t$ shown in FIG. 2B corresponds to an operating point in motoring mode (e.g., above the d-axis), an operating point in regeneration mode (e.g., below the d-axis) can be determined in a similar manner.

Figure 2C:
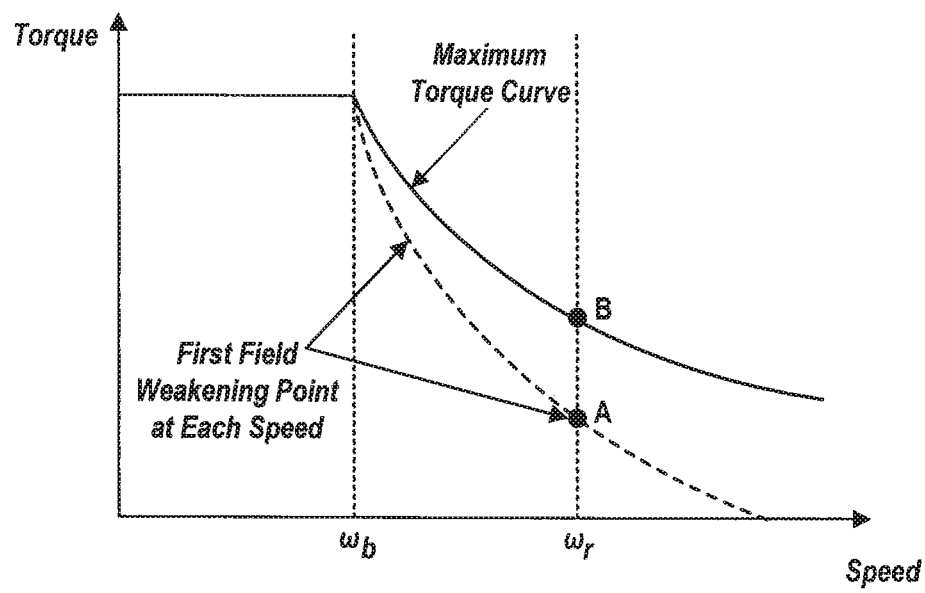
FIG. 2C shows exemplary operating points on torque curves.

FIG. 2C shows exemplary operating points on different torque curves. As shown in FIG. 2C, the maximum torque below base speed $\omega_b$ stays at a constant value. Above the base speed (e.g., at speed $\omega_r$), however, the maximum torque decreases as the speed increases. The solid line curve located beyond the base speed $\omega_b$, representing the maximum torque curve, is composed of the maximum torque points (e.g., point B as shown in FIGS. 2A and 2B) at different speeds. In other words, point B shown in FIGS. 2A and 2B is with respect to a single speed, and the maximum torque curve shown in FIG. 2C includes multiple B points determined for different speeds. The dashed line curve located beyond the base speed $\omega_b$ is composed of the first field weakening points (e.g., point A shown in FIGS. 2A and 2B) at different speeds. In the exemplary method described above that includes three parts, the first part is for determining the operating points below base speed $\omega_b$; the second part is for determining the operating points between the maximum torque curve (solid line curve) and the first field weakening point curve (dashed line curve); and the third part is for determining the operating points below the dashed line curve.

Figure 3:
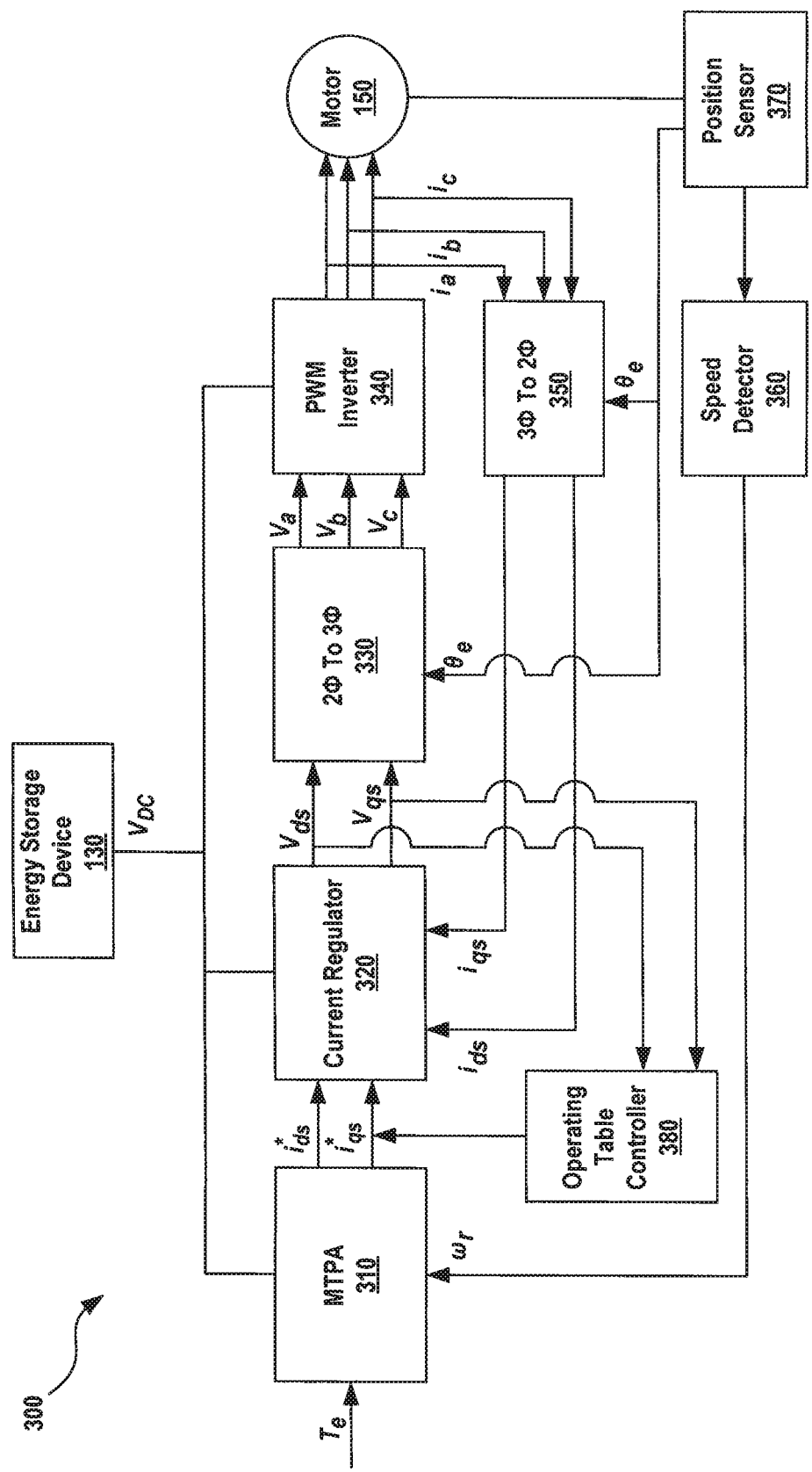
FIG. 3 is a block diagram of an exemplary motor control system including an exemplary operating table controller for determining MTPA lines in the field weakening region.

FIG. 3 is a block diagram of an exemplary embodiment of a motor control system 300 including an operating table controller 380 for determining operating points in the field weakening region of an operating table. Motor control system 300 may include an MTPA module 310. MTPA module 310 may receive a torque command $T_e$ from, for example, vehicle control module 120, and generate corresponding d axis and q axis components of a current command $(i^*_{ds}$ and $i^*_{qs})$. For example, MTPA module 310 may include one or more operating tables storing mapping relations between values of $T_e$ and values of $i^*_{ds}$ and $i^*_{qs}$ for a given rotational speed $\omega_r$ and a given DC line voltage $V_{DC}$. The current command may be input to a current regulator 320. Current regulator may determine the difference between $i^*_{ds}$ and feedback current $i_{ds}$ and the difference between $i^*_{qs}$ and feedback current $i_{qs}$ to control a voltage command ($V_{ds}$ and $V_{qs}$). The voltage command in the d-q reference frame may be converted into actual phase voltages ($V_a$, $V_b$, and $V_c$) by a two-phase to three-phase transformer 330. The actual phase voltages may be input to a PWM inverter 340 to drive motor 150. Phase currents ($i_a$, $i_b$, and $i_c$) may be measured and processed by a three-phase to two-phase transformer 350 to provide feedback currents ($i_{ds}$ and $i_{qs}$) in d-q reference frame to current regulator 320. A position sensor 370 may be used to measure the rotor position and provide the measured position information $\theta_e$ to transformers 330 and 350. The position information may also be used by a speed detector 360 to determine the rotational speed $\omega_r$.

As shown in FIG. 3, motor control system 300 may include operating table controller 380 configured to determine operating points in the field weakening region. For example, controller 380 may receive information indicative of a voltage applied to motor 150 (also referred to as voltage information) and determine the operating point based on the voltage. The voltage information may be measured or sampled by a voltage monitor, which may be part of controller 380 or a separate device. In some embodiments, the voltage information may be obtained by measuring the phase voltages $V_a$, $V_b$, and $V_c$ (not shown in FIG. 3). In some embodiments, as shown in FIG. 3, the voltage information may be obtained from the output of current controller 320, e.g., the d- and q-axis voltages $V_{ds}$ and $V_{qs}$.

In some embodiments, controller 380 may be implemented by one or more processor devices executing an algorithm and/or instructions stored in a memory device. In some embodiments, controller 380 may be implemented by one or more circuits configured to perform functions such as signal sampling, signal comparison, signal amplification or attenuation, logical operation, proportional-integral-derivative (PID) regulation, signal limitation, etc. In some embodiments, controller 380 may be implemented by a combination of processor device(s) and circuit(s).

Figure 4:
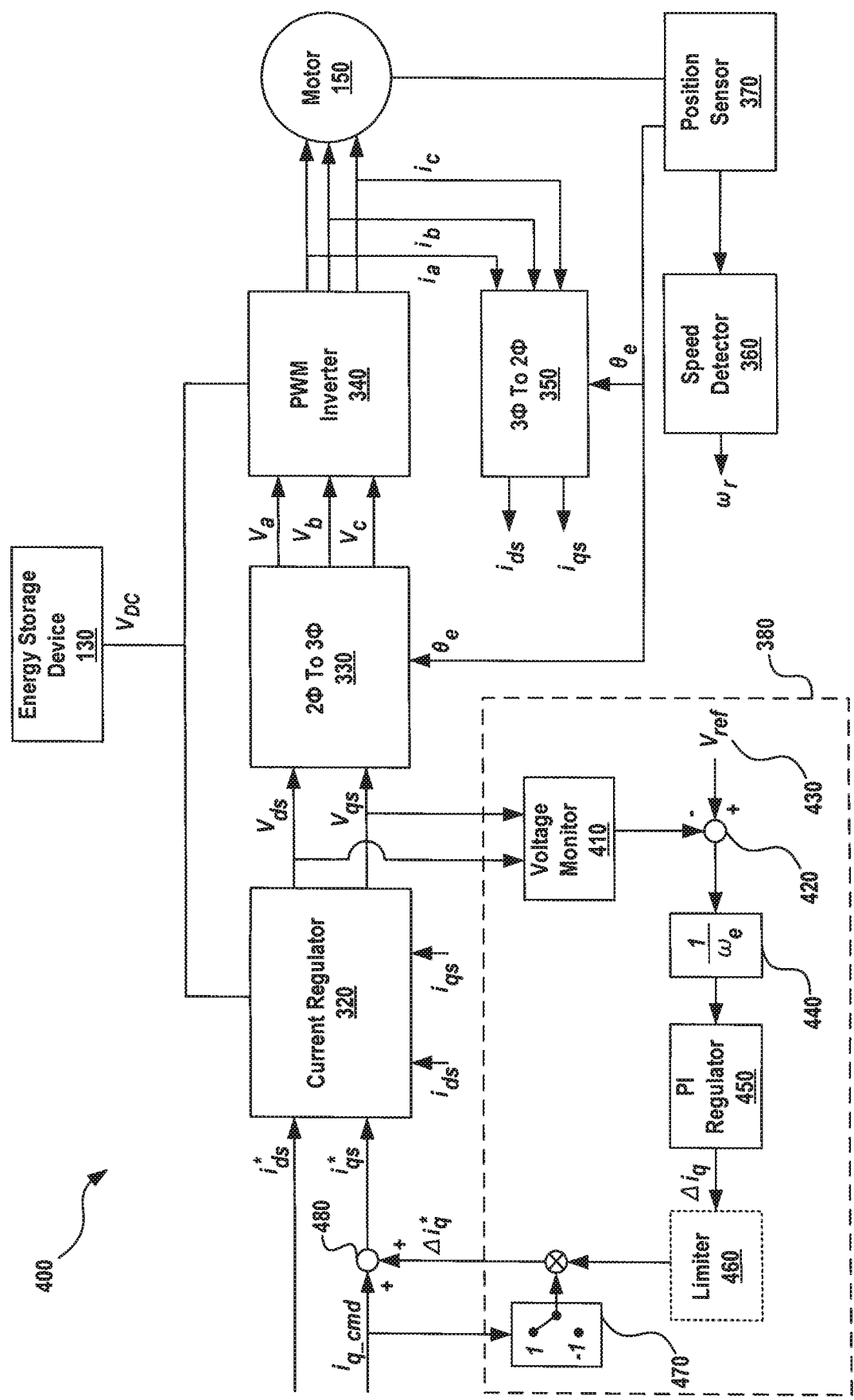
FIG. 4 shows an exemplary implementation of the operating table controller shown in FIG. 3.

FIG. 4 is a block diagram of an exemplary embodiment of a motor control system 400 including an exemplary implementation of the operating table controller 380. As shown in FIG. 4, a voltage monitor 410 may sample the d- and q-axis voltages $V_{ds}$ and $V_{qs}$ from a voltage command output by current regulator 320. Voltage monitor 410 may be integrated with controller 380, as shown in FIG. 4, or may be implemented as a separate device. Voltage monitor 410 may determine the voltage applied to motor 150 by calculating the phase voltage $V_s = \sqrt{V_{ds}^2 + V_{qs}^2}$. If the phase voltage $V_s$ is not the same as the maximum voltage, controller 380 may regulate the current command to change the phase voltage toward the maximum voltage. For example, controller 380 may include a comparator 420 configured to compare the phase voltage determined by voltage monitor 410 with a reference voltage $V_{ref}$ (430) and generate a difference between the phase voltage and the reference voltage. The difference may also be referred to as a voltage error. The reference voltage may be set to be the maximum voltage. The difference may be normalized by a normalizer 440. For example, Normalizer 440 may normalize the difference by the electrical speed $\omega_e$. The normalized difference may be input to a PI regulator 450.

As discussed above in connection with FIG. 2A, the d-axis current command may be kept unchanged, and the q-axis current command may be adjusted by PI regulator 450 to generate a correction signal $\Delta i_q$ for reducing the difference. The correction signal $\Delta i_q$ may then be input to current regulator 320 to reduce the difference. The voltage command resulting from the application of $\Delta i_q$ may be sampled and compared again with the reference voltage to further reduce the difference if necessary. This closed loop feedback process may be repeated until the difference is reduced to zero or below a predetermined tolerance threshold (e.g., when the phase voltage converges to the reference voltage). Once the phase voltage converges to the reference voltage, the corresponding current command ($i_d$, $i_q$) may be determined by controller 380 as the operating point (e.g., operating point D shown in FIG. 2A).

In some embodiments, the initial value for the q-axis current command is not limited to any particular region and can be set arbitrarily. However, the determination process may be faster if the initial value of the q-axis current command is closer to the envelop of the voltage limit ellipse.

In some embodiments, PI regulator 450 may be configured to limit the correction signal $\Delta i_q$ within a predetermined range. For example, the magnitude of $\Delta i_q$ can be limited to a relatively small value to limit the rate of change in the q-axis current command, which may result in a relatively smooth convergence at the price of reduced convergence speed. Once an operating point is found based on a particular d-axis current command, determination of a new operating point may be initiated by adjusting the d-axis current command by an increment $\Delta i_d$, as shown in FIG. 2A. The number of operating points between A and B that are required for the operating table may be predetermined or may be dynamically determined depending on particular applications.

Referring back to FIG. 2A, in the field weakening region (e.g., when motor 150 operates in a field weakening mode), the q-axis current command is positive. On the other hand, in the regeneration region (e.g., when motor 150 operates in a regeneration mode), the q-axis current command is negative. Therefore, to determine operating points in the regeneration region (e.g., in the third quadrant of the reference frame shown in FIG. 2A), controller 380 may include a sign modifier 470 to change the sign of $\Delta i_q$ based on the sign of the input q-axis current command $i_{q\_cmd}$.

In some embodiments, controller 380 may be configured to determine operating points during real-time operation of motor 150. During real time motor operation, the current command may not be altered when motor 150 is operating inside the voltage constraints. In this case, the correction signal $\Delta i_q$ has to be set to zero. When the voltage command is outside of the constraint region the correction signal $\Delta i_q$ should assume a negative value. To ensure that $\Delta i_q$ is not positive (i.e., either zero or negative) during real time operation, controller 380 may include a limiter 460. Limiter 460 may nullify the correction signal $\Delta i_q$ when $\Delta i_q$ is positive, which indicates that motor 150 operates in a non-field weakening mode, such as within the voltage limit ellipse shown in FIG. 2A. With limiter 460, controller 380 may be effective only when the q-axis current command moves outside the voltage limit ellipse. When the operating point defined by a real time current command ($i_d$, $i_q$) leaves the voltage limit ellipse, controller 380 may function to steer the operating point back to the voltage limit ellipse, e.g., a feasible operating point between A and B. Limiter 460 may be present during real time operation and may be omitted during non-real time scenarios, such as during a calibration process in a: design phase, pre-shipment testing phase, or post-shipment phase. For this reason, limiter 460 is shown as a dashed box in FIG. 4. In FIG. 4, the correction signal passing the optional limiter 460 and/or sign modifier 470 is denoted as $\Delta i^*_q$, which is added to current command $i_{q\_cmd}$ for inputting into current regulator 320.

The embodiment shown in FIG. 4 determines operation points by fixing the d-axis current command and adjusting the q-axis current command. In some embodiments, other current command regulation methods may also be used. For example, the d-axis current command may be adjusted while keeping the q-axis current command constant. In another example, both d-axis and q-axis current commands may be adjusted.

Because the operating points in the field weakening region are DC line voltage related, these operating points need to be determined for multiple DC voltage levels. The number of DC voltage levels may be determined by the minimum and maximum DC voltage levels supplied by energy storage device 130 and the desired voltage increments.

Figure 5:
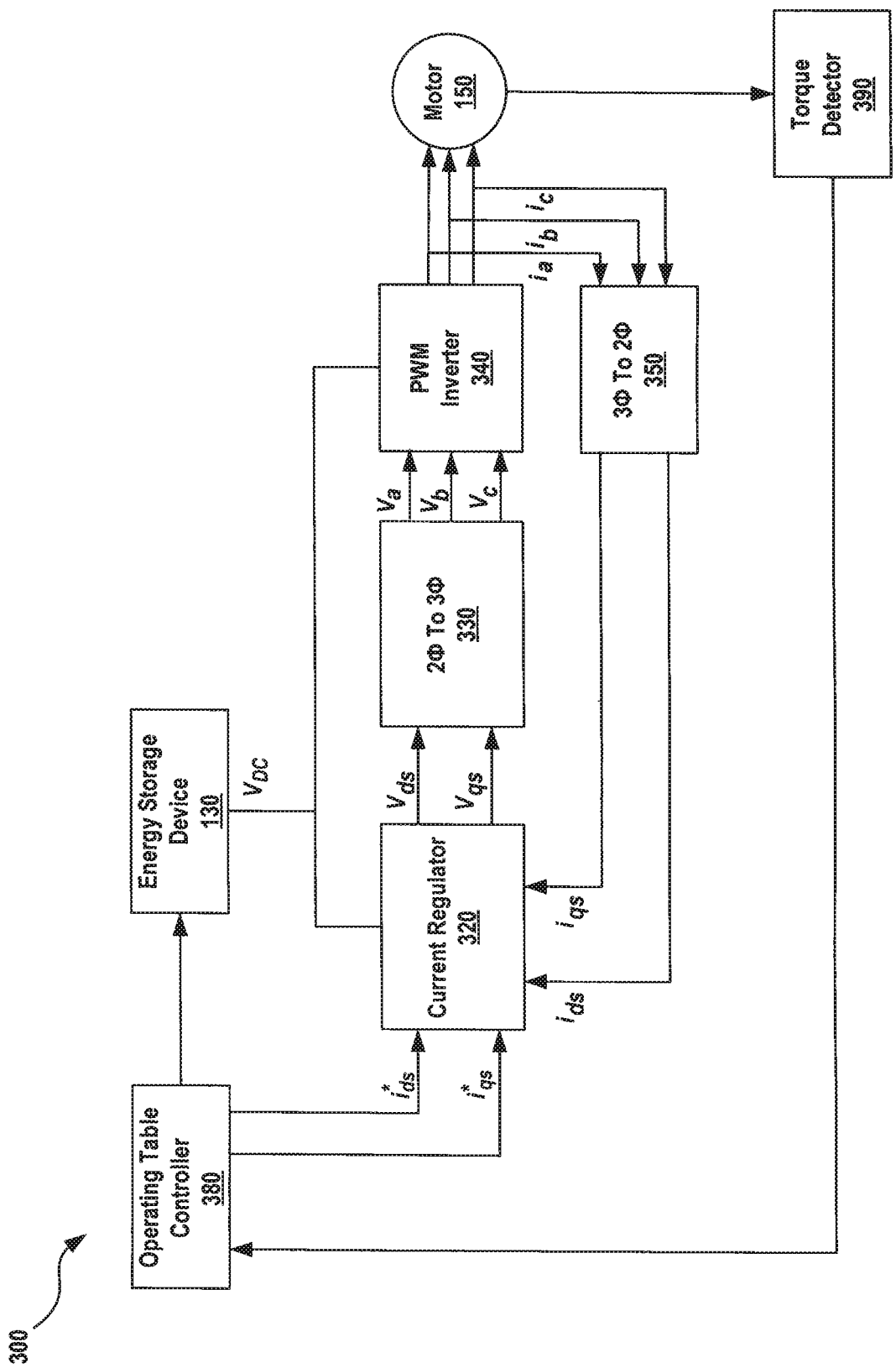
FIG. 5 shows an exemplary operating table controller for determining MTPA lines in the non-field weakening region.

FIG. 5 shows the operating table controller 380 being configured to determine the MTPA lines in the non-field weakening region. To simplify the figure, only system components that are relevant to the determination process are shown. Controller 380 may be configured to function as a single device that is capable of determining both the MPTA lines (e.g., operating points) in the field weakening region (e.g., as shown in FIGS. 3 and 4) and in the non-field weakening region (e.g., as shown in FIG. 5). For example, FIGS. 4 and 5 may be considered as highlighting the configurations (e.g., signal connections) that are specific to determine the operating points in the field weakening region and the non-field weakening region, respectively, but both are with respect to the same controller. In another example, controllers shown in FIGS. 4 and 5 may be subsystems of an integrated controller, where each subsystem is designed to determine operating points in a specific region.

As shown in FIG. 5, controller 380 may control energy storage device 130 (e.g., a DC voltage source) to supply a predetermined voltage to drive motor 150. Because the operating points in the non-field weakening region is not DC line voltage related, any DC voltage can be used. In one embodiment, the highest DC line voltage that can be supplied by energy storage device 130 is used. The determined operating points may then be used for the lower DC voltage levels.

At a given speed, controller 380 may select an operating current value, such as $i_s$ having a magnitude $I_s$, to determine a current command corresponding to the operating current value. The magnitude $I_s$ may be swept from a minimum value (e.g., about zero) to a maximum value (e.g., about or below the first field weakening point A) in an appropriate increment (or vice versa). For each given operating current value, controller 380 may generate a plurality of current commands (e.g., $i^*_{ds}$ and $i^*_{qs}$) and apply each current command to current regulator 320 to drive motor 150. A torque detector 390 may be used to detect the output torque corresponding to each current command, and send the torque information to controller 380. Controller 380 may determine, among the plurality of current commands, a target current command that generates the maximum torque based on the torque information detected by torque detector 390. The target current command may represent an operating point in the non-field weakening region corresponding to the operating current value. Information of the target current command may be recorded for generating the operating table.

Controller 380 may generate the plurality of current commands in various ways. For example, as described above in connection with FIG. 2B, controller 380 may sweep the d-axis current component $i^*_{ds}$ from zero to $-I_s$ in appropriate current increments $\Delta i_d$. Then for each $i^*_{ds}$, controller 380 may sweep the q-axis current component $i^*_{qs}$ from zero to the maximum feasible value in appropriate current increment $\Delta i_q$. The maximum feasible value of the q-axis current component can be determined by $I_{q\_max} = \sqrt{I_s^2 - I_d^2}$.

In some embodiments, in order to reduce the number of tests an estimation of the MTPA points may be conducted using, for example, measured parameters and analytical equations or FEA simulations. The estimation may help to reduce the time required for testing and post processing. In addition, accuracy may be improved because smaller current increments may be used.

Figure 6:
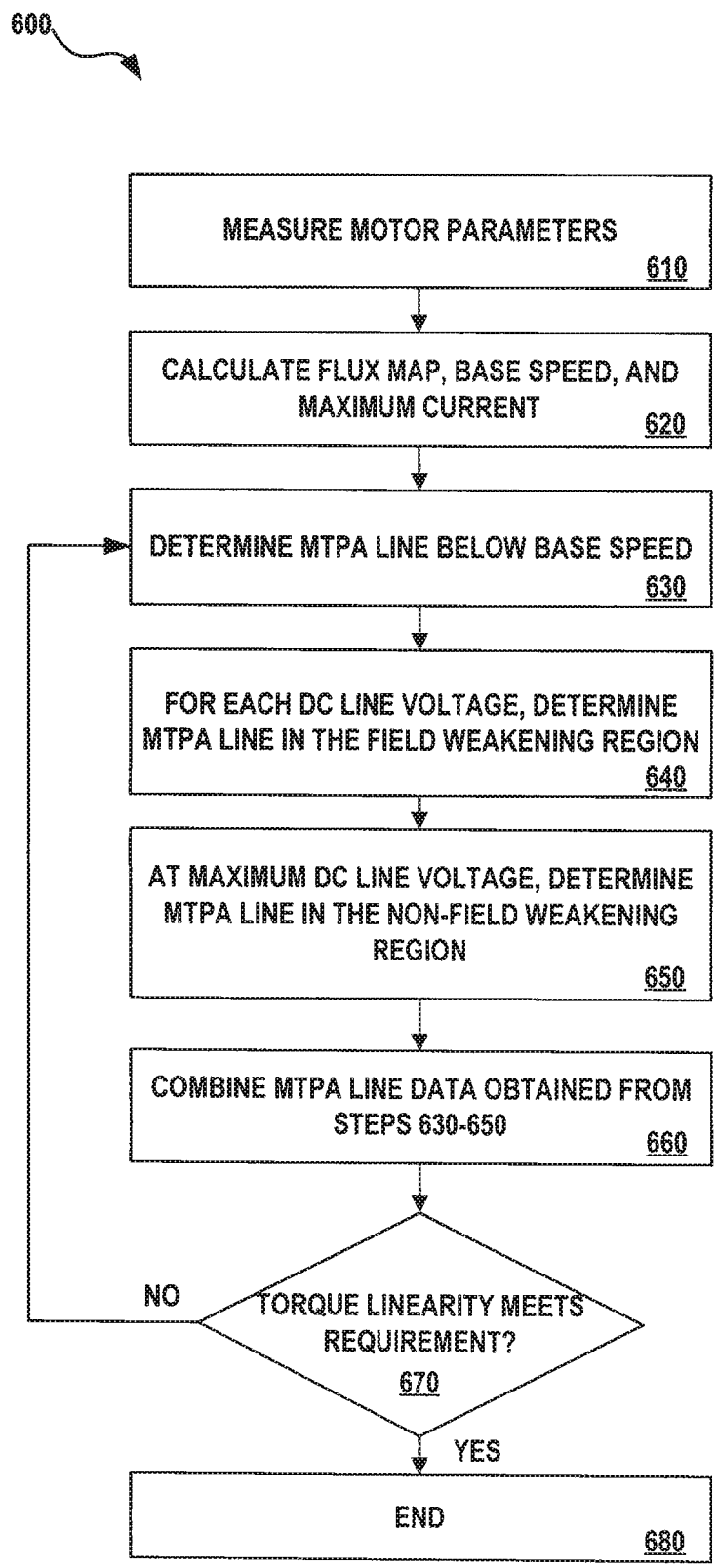
FIG. 6 is a flow chart illustrating an exemplary method of determining an operating table for controlling an electric motor.

FIG. 6 is a flowchart illustrating a method 600 for determining an operating table, according to some embodiments. Method 600 includes a plurality of steps, some of which may be omitted. Method 600 may be carried out by a processor device executing an algorithm and/or instructions, by dedicated circuitries configured to perform one or more specific functions, or by a combination thereof.

In step 610, motor parameters can be measured based on, for example, IEEE standards. Exemplary parameters include back EMF, stator resistance, etc.

In step 620, flux maps can be calculated based on the measured motor parameters and/or design parameters. Based on the flux maps and torque equations, the motor base speed can be calculated. In addition, the maximum current for the entire voltage range and speed range in motoring and regeneration modes may be calculated.

In step 630, controller 380 may determine MTPA lines bellow the base speed. Any suitable method can be used to obtain these MTPA lines.

In step 640, controller 380 may determine, for each DC line voltage, an MTPA line in the field weakening region (e.g., between points A and B in FIG. 2A) for a given speed above the base speed. For example, controller 380 may determine these MTPA lines based on the method described in connection with FIG. 2A and the circuit configurations shown in FIGS. 3 and 4.

In step 650, controller 380 may determine, at the maximum DC line voltage, an MTPA line in the non-field weakening region (e.g., between points O and A in FIG. 2B) for a given speed above the base speed. For example, controller 380 may determine these MTPA lines based on the method described in connection with FIG. 2B and the circuit configuration shown in FIG. 5. The MTPA lines may also be used in other DC line voltage levels.

In step 660, MTPA line data obtained from steps 630, 640, and 650 may be combined to generate the operating table across the entire voltage range and the speed range.

In step 670, the operating table may be tested. For example, torque linearity may be tested to determine whether the linearity meets the requirement. If the requirement is met, then method 600 ends in step 680. If the requirement is not met, then method 600 loops back to step 630 to restart the MTPA data determination process.

Figure 7:
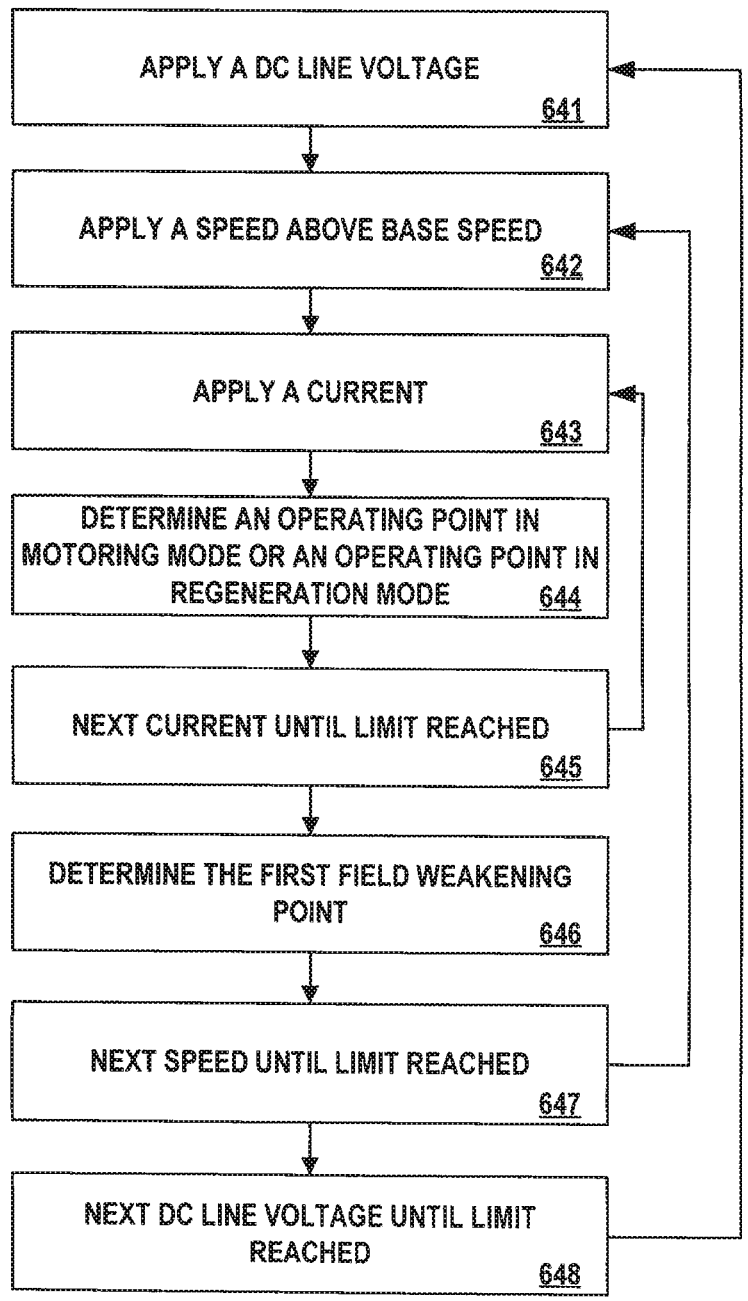
FIG. 7 is a flow chart illustrating an exemplary method of determining MTPA lines in the field weakening region.

FIG. 7 is a flowchart illustrating an exemplary method of determining MPTA data in the field weakening region (e.g., step 640). As shown in FIG. 7, step 640 may include a plurality of sub-steps. In sub-step 641, controller 380 may apply a DC line voltage. The DC line voltage may be chosen from available DC line voltage levels. For example, the entire DC line voltage levels that can be supplied by energy storage device 130 may be swept according to an appropriate increment.

In sub-step 642, controller 380 may apply a speed above the base speed to control motor 150. Similar to the DC line voltage, the available speeds may also be swept according to an appropriate increment.

In sub-step 643, controller 380 may apply a current having a corresponding magnitude. Since the maximum current has been calculated in step 620, the range of available currents may be determined and swept according to an appropriate increment.

In sub-step 644, controller 380 may determine an operating point in motoring mode or an operating point in regeneration mode. For example, the method described in connection with FIG. 2A and circuit configurations shown in FIGS. 3 and 4 may be used to determine the operation point.

In sub-step 645, the next current may be used to determine a new operating point in motoring mode or a new operation point in regeneration mode until a limit (e.g., the maximum current) is reached.

After sub-step 645, an MTPA line for a given speed and a given DC line voltage may be determined. In sub-step 646, controller 380 may determine the first field weakening point (e.g., point A in FIGS. 2A and 2B) of the MTPA line from the points obtained in step 645. Point A may be used as the upper limit for the non-field weakening region.

In sub-step 647, the next speed may be used to determine a new MTPA line for that speed until a speed limit is reached.

In sub-step 648, the next DC line voltage may be used to determine a new table until a DC voltage limit is reached.

Figure 8:
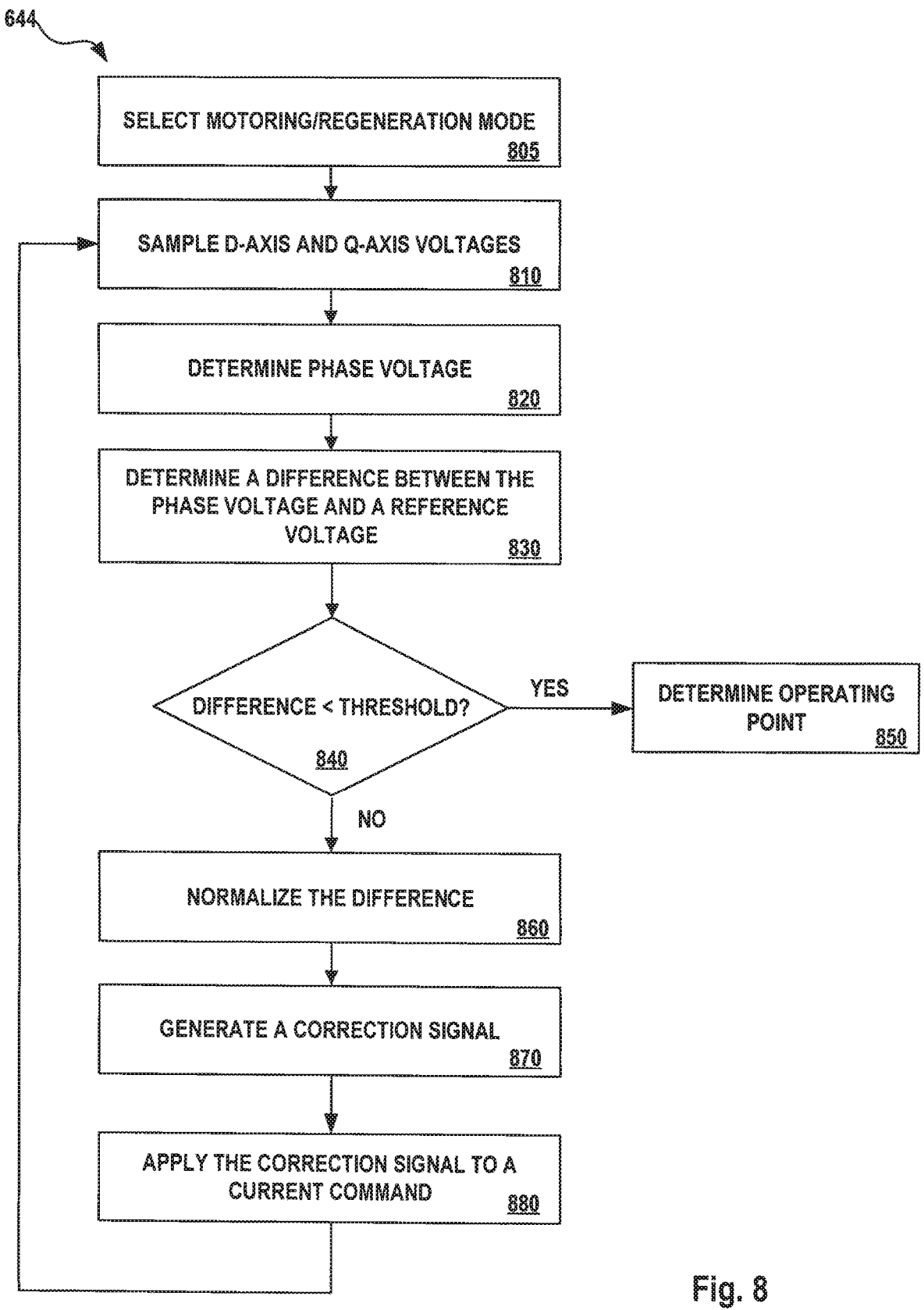
FIG. 8 is a flow chart illustrating an exemplary method of determining an operating point on an MTPA line in the field weakening region.

FIG. 8 is a flowchart depicting an exemplary implementation of step 644 for determining an operating point in the field weakening region.

In step 805, controller 380 may select an operating mode, such as the motoring mode or the regeneration mode.

In step 810, voltage monitor 410 may sample the d-axis and q-axis voltages. For example, voltage monitor 410 may sample voltages $V_{ds}$ and $V_{qs}$ from a voltage command output by current regulator 320, as shown in FIG. 4.

In step 820, voltage monitor 410 may determine the phase voltage. For example, voltage monitor 410 may calculate the phase voltage $V_s = \sqrt{V_{ds}^2 + V_{qs}^2}$.

In step 830, comparator 420 may compare the phase voltage and a reference voltage and determine a difference between the phase voltage and the reference voltage. For example, comparator 420 may compare the phase voltage and the reference voltage $V_{ref}$, which may be set as the maximum voltage that can be produced by inverter 340. As described above, the maximum voltage may depend on the DC voltage provided by power supply 340.

In step 840, controller 380 may determine whether the difference is below a predetermined threshold or whether the phase voltage converges to the reference voltage. If the difference is below the threshold, as indicated by the YES branch, the process proceeds to step 850, in which controller 380 may determine the operating point to be the corresponding current command ($i_d$, $i_q$) that is used to generate the phase voltage.

If the difference is not below the threshold, the process proceeds to step 860, in which normalizer 440 may normalize the difference. For example, normalizer 440 may normalize the difference by the electrical speed $\omega_e$.

In step 870, PI regulator 450 may generate a correction signal $\Delta i_q$ for reducing the difference. The correction signal $\Delta i_q$ may move the operating point toward the voltage limit ellipse shown in FIG. 2A. In some embodiments, the correction signal $\Delta i_q$ may be limited to a predetermined range to limit the rate of change in the current command.

In step 880, controller 380 may apply the correction signal $\Delta i_q$ to a current command (e.g., $i_{q\_cmd}$) that is input to current regulator 320 to reduce the difference. For example, $\Delta i_q$ may be added to $i_{q\_cmd}$ and the resulting value may be used as the new input q-axis current command. The new current command may result in a new voltage response at the output of current regulator 320, which may be sampled and further compared with the reference voltage (e.g., looping back to step 810) until the difference is reduced below the threshold, e.g., when the phase voltage converges to the reference voltage.

Figure 9:
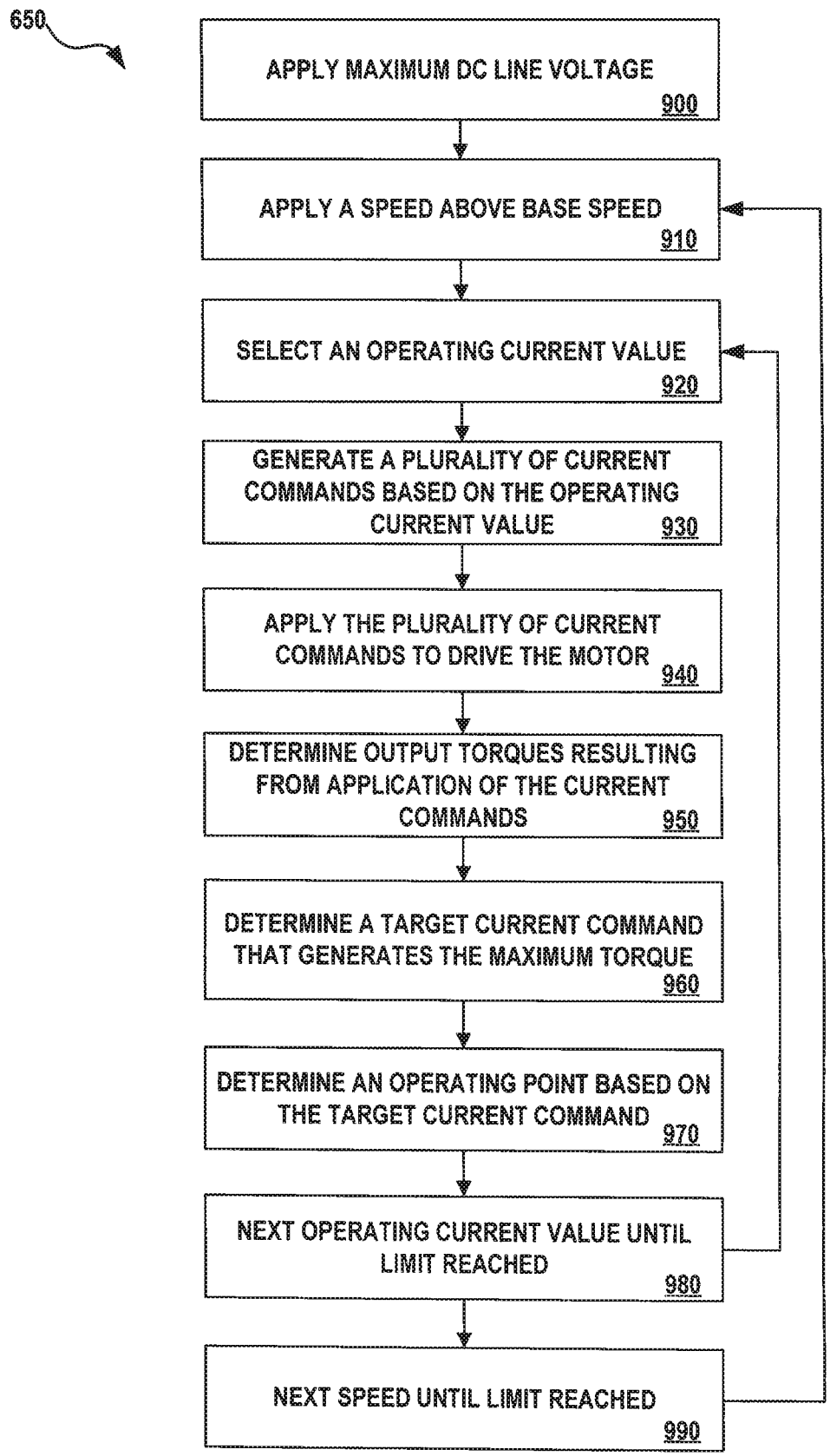
FIG. 9 is a flow chart illustrating an exemplary method of determining MTPA lines in the non-field weakening region.

FIG. 9 is a flowchart of an exemplary implementation of step 650 for determining MTPA lines in the non-field weakening region.

In step 900, controller 380 may control energy storage device 130 to apply the maximum DC line voltage.

In step 910, controller 380 may apply a speed above the base speed to control motor 150. Similar to sub-step 642, the available speeds may be swept according to an appropriate increment.

In step 920, controller 380 may select an operating current value having a corresponding magnitude. Since the first field weakening point has been determined in step 646, which may be used as the upper limit for the operating current value, the range of available current values may be determined and swept according to an appropriate increment.

In step 930, controller 380 may generate a plurality of current commands based on the operating current value. For example, controller 380 may generate the plurality of current commands by sweeping the d-axis current component from zero to minus the magnitude of the operating current value. At each d-axis current, controller 380 may sweep the q-axis current component from zero to the maximum feasible value (e.g., $I_{q\_max} = \sqrt{I_s^2 - I_d^2}$).

In step 940, controller 380 may apply the plurality of current commands to current regulator 320 to drive motor 150.

In step 950, controller 380 may determine output torques resulting from application of the current commands. For example, the output torque information may be detected by torque detector 390.

In step 960, controller 380 may determine a target current command that generates the maximum torque. For example, controller 380 may compare the output torques and determine the maximum torque for the same current magnitude, then determine the corresponding current command that generates the maximum torque as the target current command.

In step 970, controller 380 may determine an operating point based on the target current command. For example, the operation point may be represented by the d-axis and q-axis current components of the target current command or by the magnitude and angle of the current command.

In step 980, the next operating current value may be used to determine a new operating point in the non-field weakening region until a limit (e.g., the minimum current or the current at point A).

After completing step 980, an MTPA line in the non-field weakening region for a given speed may be determined.

In step 990, the next speed may be used to determine a new MTPA line at a different speed until a speed limit is reached.

Because the MTPA lines in the non-field weakening region are not DC line voltage dependent, it is not necessary to sweep the DC line voltage as in step 640. Rather, the MTPA data may be used for lower DC line voltage levels.

The embodiments disclosed above include systems and methods for determining operating table of an electric motor. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed embodiments are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be used in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples of computer-readable media include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A system for controlling an electric motor, the system comprising:

a torque detector configured to detect an output torque of the electric motor; and a controller configured to:
control a voltage source to apply a predetermined voltage to drive the electric motor;
determine an operating table containing a plurality of operating points, the operating table configured to receive a torque command and a motor speed of the electric motor and output a current command based on the received torque command and motor speed, wherein at least a first operating point of the operating table is determined by:
(a) selecting an operating current value;
(b) generating a plurality of current commands based on the operating current value;
(c) applying each of the plurality of current commands to drive the electric motor;
(d) determining, using the torque detector, an output torque generated by the electric motor resulting from application of each of the plurality of current commands;
(e) determining, from the plurality of current commands, a target current command that generates a maximum output torque; and
(f) determining the first operating point of the operating table based on the target current command and the maximum output torque;
repeating (a)-(f) to determine a next operating point in a non-field weakening region until a current limit is reached; and
control the electric motor using the operating table.

2. The system of claim 1, wherein: the voltage source is configured to supply a direct current (DC) voltage; and the predetermined voltage is a highest possible DC voltage supplied by the voltage source.

3. The system of claim 1, wherein the first operating point is associated with a rotating speed of the electric motor that is higher than a base rotating speed of the electric motor.

4. The system of claim 1, wherein:
each of the plurality of current commands includes direct and quadrature components of a corresponding current vector in a reference frame; and
the controller is configured to generate the plurality of current commands by:
sweeping the direct component between zero to minus the magnitude of the operating current value; and
for each direct component in the sweep, sweeping the quadrature component between zero to a maximum feasible value or between zero to minus the maximum feasible value, wherein the maximum feasible value of the quadrature component is determined based on the magnitude of the operating current value and the direct component used for sweeping the quadrature component.

5. The system of claim 1, further comprising:
a voltage monitor configured to determine a voltage applied to the electric motor,
wherein the controller is further configured to determine a second operating point of the operating table based on the voltage, the controller further including:
a comparator configured to determine a difference between the voltage and a reference voltage; and
a regulator configured to generate a correction signal for reducing the difference;
wherein the controller is configured to determine the second operating point when the difference is below a predetermined threshold.

6. The system of claim 5, wherein the second operating point includes a maximum torque per ampere (MTPA) point in a field weakening region.

7. The system of claim 5, wherein:
the electric motor is driven by an inverter configured to convert a direct current (DC) voltage to an alternating current (AC) voltage applied to a stator of the electric motor; and
the reference voltage is a maximum AC voltage that can be produced by the inverter by converting the DC voltage.

8. The system of claim 5, wherein the voltage monitor is configured to:
sample direct and quadrature components of a voltage command output by a current regulator; and
determine the voltage applied to the electric motor based on the direct and quadrature components of the voltage command.

9. The system of claim 5, wherein: the controller includes a normalizer configured to normalize the difference determined by the comparator; and the regulator is configured to generate the correction signal based on the normalized difference.

10. The system of claim 5, wherein the regulator is configured to limit the correction signal within a predetermined range.

11. The system of claim 5, wherein the controller includes a limiter to nullify the correction signal when the correction signal indicates that the electric motor operates in a non-field weakening mode.

12. The system of claim 5, wherein the controller is configured to:
determine whether the electric motor operates in a regeneration mode; and
modify the correction signal when it is determined that the electric motor operates in the regeneration mode.

13. A method for controlling an electric motor, the method comprising:
controlling a voltage source to apply a predetermined voltage to drive the electric motor;
(a) selecting an operating current value;
(b) generating a plurality of current commands based on the operating current value;
(c) applying each of the plurality of current commands to drive the electric motor;
(d) determining an output torque generated by the electric motor resulting from application of each of the plurality of current commands;
(e) determining, from the plurality of current commands, a target current command that generates a maximum output torque;
(f) determining a first operating point of an operating table based on the target current command and the maximum output torque, the operating table configured to receive a torque command and a motor speed of the electric motor and output a current command based on the received torque command and motor speed;
repeating (a)-(f) to determine a next operating point in a non-field weakening region until a current limit is reached; and
controlling the electric motor using the operating table.

14. The method of claim 13, further comprising: supplying, by the voltage source, a direct current (DC) voltage, wherein the predetermined voltage is a highest possible DC voltage supplied by the voltage source.

15. The method of claim 13, wherein the first operating point is associated with a rotating speed of the electric motor that is higher than a base rotating speed of the electric motor.

16. The method of claim 13, wherein:
each of the plurality of current commands includes direct and quadrature components of a corresponding current vector in a reference frame; and
generating the plurality of current commands based on the operating current value includes:
sweeping the direct component between zero to minus the magnitude of the operating current value; and
for each direct component in the sweep, sweeping the quadrature component between zero to a maximum feasible value or between zero to minus the maximum feasible value, wherein the maximum feasible value of the quadrature component is determined based on the magnitude of the operating current value and the direct component used for sweeping the quadrature component.

17. The method of claim 13, further comprising:
determining, by a voltage monitor, a voltage applied to the electric motor; and
determining a second operating point based on the voltage, including:
determining, by a comparator, a difference between the voltage and a reference voltage;
generating, by a regulator, a correction signal for reducing the difference; and
determining the operating point when the difference is below a predetermined threshold.

18. The method of claim 17, wherein the first operating point includes a maximum torque per ampere (MTPA) point in a field weakening region.

19. The method of claim 17, further comprising:
converting, by an inverter, a direct current (DC) voltage to an alternating current (AC) voltage to drive the electric motor, wherein the reference voltage is a maximum AC voltage that can be produced by the inverter by converting the DC voltage.

20. The method of claim 17, further comprising:
sampling, by the voltage monitor, direct and quadrature components of a voltage command output by a current regulator; and
determining, by the voltage monitor, the voltage applied to the electric motor based on the direct and quadrature components of the voltage command.

21. The method of claim 17, further comprising:
normalizing the difference between the voltage and the reference voltage; and
generating the correction signal based on the normalized difference.

22. The method of claim 17, further comprising: limiting, by the regulator, the correction signal within a predetermined range.

23. The method of claim 17, further comprising: nullifying, by a limiter, the correction signal when the correction signal indicates that the electric motor operates in a non-field weakening mode.

24. The method of claim 17, further comprising:
determining whether the electric motor operates in a regeneration mode; and
modifying the correction signal when it is determined that the electric motor operates in the regeneration mode.

* * * * *